Oct. 28, 1947. L. W. RAWSON 2,429,697
CENTRIFUGAL CLUTCH
Filed Jan. 15, 1944
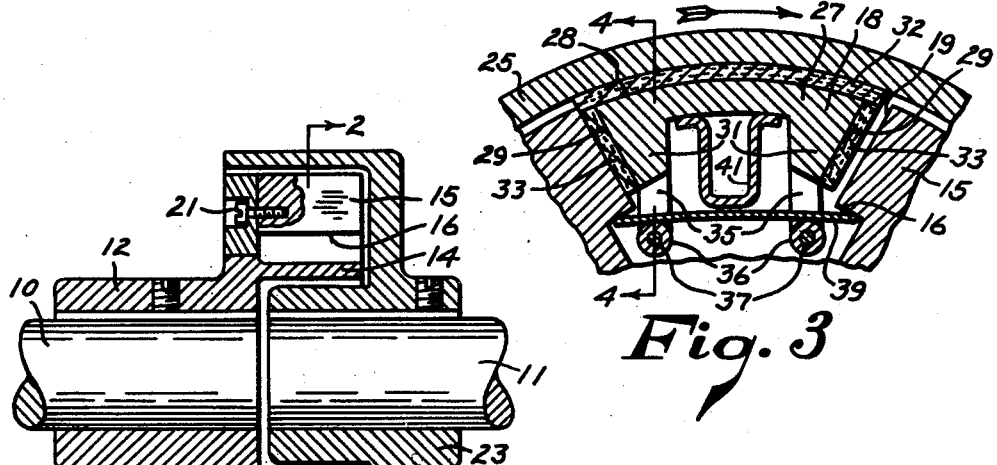
Fig. 3
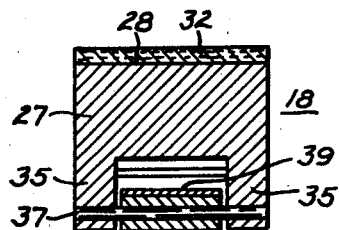
Fig. 1
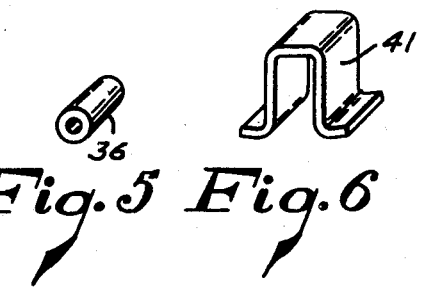
Fig. 4
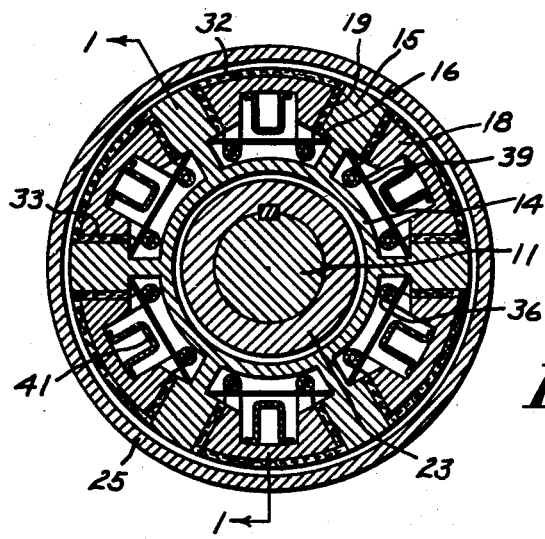
Fig. 2
Fig. 5  Fig. 6
Inventor
LOUIS W. RAWSON
By Albert G. Blodgett
Attorney Patented Oct. 28, 1947

2,429,697

UNITED STATES PATENT OFFICE 2,429,697

CENTRIFUGAL CLUTCH

Louis W. Rawson, Worcester, Mass., assignor to Worcester Polytechnic Institute, Worcester, Mass., a corporation of Massachusetts Application January 15, 1944, Serial No. 518,430

4 Claims. (Cl. 192—105)

This invention relates to centrifugal clutches, and more particularly to clutches of the type having revoluble friction shoes which are thrown outwardly by centrifugal force into contact with a surrounding drum in order that power may be transmitted from one rotatable element to another.

Clutches of this type are often used in connection with internal combustion engines to transmit power therefrom to other machines. Such engines produce a pulsating torque, and the pulsations will travel directly through the usual clutch to the driven machine, causing vibration and shortening the useful life of the machine. A reduction in such vibration is highly desirable. It is also desirable to construct the clutch in such a way that the shoes will remain out of engagement with the drum until a predetermined speed is reached. This will permit the engine to be started and to run at idling speed without transmitting any power. The clutch engaging speeds should be capable of accurate determination by comparatively simple calculations.

It is accordingly one object of the invention to provide a relatively simple and dependable centrifugal clutch particularly adapted for connecting an internal combustion engine to a driven machine.

It is a further object of the invention to provide a centrifugal clutch which will serve not only as an efficient power-transmitting mechanism but also as a means for damping torsional vibrations.

It is a further object of the invention to provide a centrifugal clutch which will operate efficiently throughout a long life of useful service, the construction being such that the speed required for clutch engagement can be readily calculated.

With these and other objects in view, as will be apparent to those skilled in the art, the invention resides in the combination of parts set forth in the specification and covered by the claims appended hereto.

Referring to the drawings illustrating one embodiment of the invention and in which like reference numerals indicate like parts, Fig. 1 is a longitudinal section through a centrifugal clutch, taken on the line 1—1 of Fig. 2;

Fig. 2 is a section on the line 2—2 of Fig. 1, the parts being shown in their stationary positions;

Fig. 3 is an enlarged view of a portion of Fig. 2, showing one of the clutch shoes in its engaged position;

Fig. 4 is a section through a clutch shoe, taken on the line 4—4 of Fig. 3;

Fig. 5 is a perspective view of a roller; and

Fig. 6 is a perspective view of a stop device.

The embodiment illustrated comprises a driving shaft 10 and a driven shaft 11 axially aligned therewith. On the driving shaft 10 there is mounted a hub 12 having a hollow cylindrical portion 14 projecting coaxially therefrom. The cylindrical portion 14 is provided with a series of outwardly projecting radial ribs or abutments 15 which are undercut on opposite sides to provide inwardly facing shoulders 16. These ribs form pockets therebetween for the reception of friction shoes 18, the ribs having approximately radial plane surfaces 19 located outwardly of the shoulders 16. A ring 20 is removably fastened by means of screws 21 to the ribs 15 in order to close the ends of the pockets adjacent the hub 12, while permitting access to the shoes. On the driven shaft 11 there is mounted a hub 23 which is connected by an outwardly extending transverse web 24 to a hollow cylindrical drum 25. This drum surrounds the friction shoes 18. As the driving shaft 10 rotates, the ribs 15 will force the shoes 18 to revolve, and centrifugal force will cause the shoes to move outwardly into frictional engagement with the inner surface of the drum 25 (if the speed is sufficiently high), thus driving this drum and the shaft 11 connected thereto.

Referring now to Fig. 3, it will be seen that each shoe 18 comprises a metal body 27 having an arcuate convex cylindrical outer surface 28 and two plane side surfaces 29 extending inwardly from the surface 28. The plane surfaces 29 are approximately radial so that they converge in the inward direction, and they are formed on two ribs 31 which extend inwardly at the opposite sides of the body 27. A sheet 32 of a suitable friction material is secured in contact with the curved outer surface 28, and a separate flat sheet 33 of a suitable friction material is secured in contact with each of the side surfaces 29. The shoes are so shaped with relation to the pockets that when a shoe is in its innermost position, with the side sheets 33 on both sides engaging the flat surfaces 19 of the adjacent ribs 15 (as shown in Fig. 2), there will be an appreciable clearance space between the curved outer sheet 32 and the inner surface of the surrounding drum 25. When a shoe is in its outermost position, with the curved outer sheet 32 in engagement with the inner surface of the drum 25, and with one of the side sheets 33 engaging the surface 19 of the adjacent rib 15 (as shown in Fig. 3), there will be an appreciable clearance space between the other side sheet and the surface 19 of the adjacent rib.

Means is provided to hold the shoes 18 out of contact with the surrounding drum 25 until they have attained a predetermined speed of revolution. For this purpose each shoe is provided with two pairs of spaced ears 35 located at opposite sides of the shoe and extending inwardly. Between the ears 35 of each pair there is mounted a cylindrical idler roller 36 which is rotatably supported on a pin 37 extending transversely through the ears and parallel with the axis of the drum. A flat strip 39 of a suitable resilient material, such as spring steel, extends between the ears 35 of both pairs in a position outwardly of the rollers 36, the ends of the strip engaging the adjacent inwardly facing shoulders 16 and the inner surface of the strip engaging the rollers. These parts are so arranged that when the shoes are in their innermost positions the strips 39 will be substantially straight, whereas outward movement of the shoes will bend or deflect the strips outwardly into a curve, as shown in Fig. 3.

If the speed of rotation of the clutch greatly exceeds that necessary to effect engagement of the shoes with the drum 25, the resultant centrifugal force acting on the strips 39 will cause them to bend still further outwardly. In case this outward bending is allowed to continue, the ends of the strip will be withdrawn from the retaining shoulders 16, and the strips will not return to their proper positions when the clutch is finally brought to rest. This difficulty is avoided in the present invention by providing a stop in the form of a U-shaped device 41 suitably secured by welding or otherwise to the inner surface of the shoe body 27. This stop device 41 extends inwardly into proximity with the outer surface of the strip 39, with sufficient space between these parts to permit normal outward deflection of the strip and yet limit this deflection while the ends of the strip still remain in contact with the shoulders 16.

The operation of the invention will now be apparent from the above disclosure. So long as the driving shaft 10 remains stationary, the springs 39 will hold the shoes 18 inwardly as shown in Fig. 2, with both the side sheets 33 of each shoe engaging the flat surfaces 19 of the adjacent ribs 15. When the shaft 10 is rotated and the speed is increased to a predetermined value, the centrifugal force on the shoes will cause them to move outwardly into contact with the surrounding drum 25, at the same time flexing the springs 39, as shown in Fig. 3. The friction of the shoes against the inner surface of the drum will gradually accelerate the drum and the shaft 11 until all these parts are revolving at the same speed.

If the shaft 10 is driven by an internal combustion engine or other prime mover which produces a pulsating torque, the clutch will have a decided effect in smoothing out the pulsations, and the driven shaft 11 will be substantially free from torsional vibrations. It will be noted from Fig. 3 that the torque is transmitted through the clutch by the pressure of the ribs 15 against one side of each shoe 18, the opposite side of the shoe being spaced appreciably from the adjacent rib. Consequently there is permitted a limited relative motion between the ribs 15 on the one hand and the drum 25 on the other hand, without requiring any slipping of the shoes with relation to the drum. During such relative motion, the shoes move back and forth in a generally circumferential direction between the abutments and relative to the flat springs 39, and the rollers 36 will roll on the springs and thereby prevent any appreciable friction which would tend to prevent such motion. Thus the angular velocity of the driving shaft 10 may be alternately greater and less than that of the driven shaft 11, and the angular velocity of the driven shaft will remain substantially uniform despite a pulsating torque in the driving shaft, so that torsional vibration will be substantially eliminated from the driven shaft. It will be understood that the torque pulsations may be either rapid or slow, depending upon the type of driving engine and its connection with the shaft 10, but ordinarily there will be at least one or more pulsations for each revolution of the clutch, when the engine is of the internal combustion type.

As the speed rotation is increased, the centrifugal force acting on the springs 39 will increase, tending to flex these springs outwardly. At high speeds there is danger of such flexing continuing so far that the ends of the springs will be withdrawn from engagement with the inwardly facing shoulders 16, but this is prevented by the action of the U-shaped devices 41 which lie directly outside the springs and thus limit their outward movement. Consequently the springs will remain in position to withdraw the shoes 18 from contact with the drum 25 whenever the speed of rotation of the driving shaft 10 is reduced to a predetermined value.

The flat strips or springs 39 form simple beams of uniform cross-section from end to end, and each beam is subjected to two concentrated loads at predetermined points. The calculation of the deflections of such beams under given loads is a very simple matter, so that the selection of the proper size of strip for a desired clutch engaging speed is comparatively easy. The clutch can thus be readily adapted to various operating conditions. The construction is rugged and dependable, it will function as an effective damper of torsional vibrations, and it will operate satisfactorily throughout a long life of useful service despite the destructive effect of such vibrations.

Having thus described my invention, what I claim as new and desire to secure by Letters Patent is:

1. A centrifugal clutch comprising two relatively rotatable coaxial members one of which provides a drum with an inner cylindrical surface and the other of which provides a series of circumferentially spaced abutments forming pockets therebetween surrounded by the drum, friction shoes located in the pockets and so proportioned that when a shoe is in contact with the inner surface of the drum and with one of the adjacent abutments a clearance will exist between the shoe and the other adjacent abutment, a pair of spaced ears extending inwardly from each shoe, a pin extending through the ears, an idler roller mounted on the pin between the ears, and a flat spring extending between the ears with its inner surface engaging the roller and its ends supported by the adjacent abutments, the spring urging the shoe yieldably inwardly out of contact with the drum.

2. A centrifugal clutch comprising two relatively rotatable coaxial members one of which provides a drum with an inner cylindrical surface and the other of which provides a series of circumferentially spaced abutments forming pockets therebetween surrounded by the drum, friction shoes located in the pockets and so proportioned that when a shoe is in contact with the inner surface of the drum and with one of the adjacent abutments a clearance will exist between the shoe and the other adjacent abutment, two pairs of spaced ears extending inwardly from each shoe, a separate pin extending through the ears of each pair, an idler roller mounted on each pin between the ears, and a flat spring extending between the ears of each pair with its inner surface engaging both the rollers and its ends supported by the adjacent abutments, the spring urging the shoe yieldably inwardly out of contact with the drum.

3. A centrifugal clutch comprising two relatively rotatable coaxial members one of which provides a drum with an inner cylindrical surface and the other of which provides a series of circumferentially spaced abutments surrounded by the drum, friction shoes located between the abutments and movable outwardly into engagement with the inner surface of the drum under the influence of centrifugal force, a flat spring located adjacent the inner side of each shoe with the ends of the spring supported by the adjacent abutments, means on each shoe engaging the inner surface of the adjacent spring at two points located on opposite sides of the center of the spring so that the spring will urge the shoe yieldably inwardly out of contact with the drum, and means on each shoe in position to be engaged by the outer surface of the adjacent spring to limit outward deflection of the spring under the influence of centrifugal force.

4. A centrifugal clutch comprising two relatively rotatable coaxial members one of which provides a drum with an inner cylindrical surface and the other of which provides a series of circumferentially spaced abutments forming pockets therebetween surrounded by the drum, the abutments being shaped to provide inwardly facing shoulders and approximately radial plane surfaces located outwardly of the shoulders, friction shoes located in the pockets, each shoe having an outer arcuate surface for contact with the inner surface of the drum and two approximately radial plane side surfaces for contact with the said plane surfaces of the adjacent abutments, a flat spring located adjacent the inner side of each shoe with its ends engaging the shoulders on the adjacent abutments, means on each shoe engaging the inner surface of the adjacent spring at two points located on opposite sides of the center of the spring so that the spring will urge the shoe yieldably inwardly out of contact with the drum, and a stop device extending inwardly from each shoe into proximity with the outer surface of the spring at the central portion thereof to limit outward deflection of the spring under the influence of centrifugal force.

LOUIS W. RAWSON.

REFERENCES CITED

The following references are of record in the file of this patent:

UNITED STATES PATENTS

| Number | Name | Date |
|---|---|---|
| 1,727,467 | Johnson | Sept. 10, 1929 |

FOREIGN PATENTS

| Number | Country | Date |
|---|---|---|
| 199,796 | Great Britain | June 28, 1923 |